United States Patent [19]

Coskun et al.

[11] Patent Number: 5,590,330
[45] Date of Patent: Dec. 31, 1996

[54] METHOD AND SYSTEM FOR PROVIDING A TESTING FACILITY IN A PROGRAM DEVELOPMENT TOOL

[75] Inventors: Nurcan Coskun; Bruce A. Tate, both of Austin, Tex.

[73] Assignee: International Business Machines Corporation, Armonk, N.Y.

[21] Appl. No.: 354,695

[22] Filed: Dec. 13, 1994

[51] Int. Cl.$^6$ .................. G06F 9/45; G06F 3/14
[52] U.S. Cl. .............. 395/704; 395/183.14; 395/326; 395/340; 395/352; 395/348
[58] Field of Search .................. 395/155, 156, 395/157, 159, 183.14, 700

[56] References Cited

U.S. PATENT DOCUMENTS

| | | | |
|---|---|---|---|
| 4,885,717 | 12/1989 | Beck et al. | 364/900 |
| 5,014,192 | 5/1991 | Mansfield et al. | 364/200 |
| 5,093,914 | 3/1992 | Coplien et al. | 395/700 |
| 5,163,130 | 11/1992 | Hullot | 395/148 |
| 5,175,856 | 12/1992 | Van Dyke et al. | 395/700 |
| 5,179,702 | 1/1993 | Spix et al. | 395/650 |
| 5,247,651 | 9/1993 | Clarisse | 395/500 |
| 5,327,529 | 7/1994 | Fults et al. | 395/155 |
| 5,410,648 | 4/1995 | Pazel | 395/158 |
| 5,428,734 | 6/1995 | Haynes et al. | 395/159 |
| 5,475,843 | 12/1995 | Halviatti et al. | 395/700 |

*Primary Examiner*—Kevin A. Kriess
*Assistant Examiner*—Kakali Chaki
*Attorney, Agent, or Firm*—Jeffrey S. LaBaw; Andrew J. Dillon

[57] ABSTRACT

A method and system for testing a script or section of code within program using a graphic user interface. The data processing system also includes an object oriented system having a first and second object within it. A script or a section of code is associated with the first object, wherein the script or section of code is associated as a method within the first object. A second object is displayed within the graphic user interface, wherein the second object may be selected by a user. Selection of the second object within the graphic user interface by a user results in a message being sent to the first object triggering execution of the script or section of code. Such a system provides an efficient method and apparatus for testing a script or section of code.

12 Claims, 8 Drawing Sheets

METHOD AND SYSTEM FOR PROVIDING A TESTING FACILITY IN A PROGRAM DEVELOPMENT TOOL

BACKGROUND OF THE INVENTION

1. Technical Field

The present invention generally relates to an improved data processing system and in particular to an improved method and system for programming in a graphic user interface. Still more particularly, the present invention relates to a method and system for debugging a program in a graphic user interface.

2. Description of the Related Art

The development of application and system software for data processing systems has traditionally been a time consuming task. The field of software engineering has attempted to overcome the limitations of traditional techniques by proposing new, more efficient software development models. Object oriented programming has emerged as a promising technology that will allow rapid development, implementation and customization of objects. Each new object has certain data attributes and processes or methods that operate on that data. Data is said to be "encapsulated" by an object and can only be modified by the object methods are invoked by sending a message to an object identifying the method and supplying any needed arguments.

Object oriented systems have two important properties in addition to encapsulation. "Inheritance" is the ability to derive a new object from an existing object and inherit all properties, including methods and data structure, from the existing object. The new object may have certain unique features which are supplied as overrides or modifications to the existing class. For example, a new subclass needs to specify only the functions and data that distinguish that class from the existing more general class.

The ability to override an existing method description enables polymorphism, the ability to have a single message to an object be processed in different ways depending on the object itself.

Inheritance and polymorphism create a powerful structure for implementing new software systems. The software developer does not have to develop each piece of a system, he or she need only specify the unique features of the system.

The power of object oriented systems is realized through the development of system "frameworks." A framework is a collection of base classes that can be used by a system implementor to create a final systems product. The framework is defined and developed to work together as a system. Conceptually, the framework is much like a set of standard hardware components used by computer hardware builders. Each of the components has certain defined functions and interfaces and the engineer assembles these components according to a particular design to create a unique hardware system.

One object oriented programming system is the System Object Model (SOM). More information on SOM can be found in SOMobjects Developer Toolkit Users Guide, Version 2.0, June 1993, available from International Business Machines Corporations.

Programming Graphic User Interfaces (GUI) has become more and more difficult. New program systems, such as Presentation Manager (PM) available from International Business Machines Corporation or Windows available from Microsoft Corporation have made GUI's easier to use, but more difficult to program. "Windows" is a trademark of Microsoft Corporation Object oriented programming has made this process easier. Visual builder systems also called "visual programming systems", such as Microsoft's Visual Basic, have made the process easier.

One possible design for a visual builder system employs an object oriented approach in which each element of a user interface, such as a window, a button, or an entry field, is treated as an object. The term "object" refers to and encapsulation of data and services that manipulate that data. Each object supports methods (such as resize), data (such as color), and events (such as button-was-pressed). Programming in such a system is done by causing an event to execute a method on an object. This type of programming can be performed visually by drawing a line from the source object, which generates the event, to a target object on which a method is executed. A user can then specify which method is to be executed as depicted in FIG. 1. With reference to FIG. 1, a diagram of a window in which visual programming may be performed is depicted. With reference to FIG. 1, graphic user interface 2 consists of a window 4 and a button 6. A user may draw a link 8 button 6 to window 4 using pointer 7 and select a method called "close". In response, selection of button 6 results in window 4 being closed. This type of interface is presented within SmallTalk Parts available from DigiTalk and VisualAge available from International Business Machines Corporation.

The term "mouse", when used in this document, refers to any type of operating system supported graphical pointing device including, but not limited to: a mouse, trackball, light pen, touch screen, and the like. A pointing device is typically employed by a user of a data processing system to interact with a data processing system's GUI. A "pointer" is an iconic image controlled by a mouse or other such device and is displayed on the video display device of a data processing system to visually indicate to the user icons, menus, or the like that may be selected or manipulated.

Such an approach may be extended by permitting a programmer to write a script in window 9 and attach it to an event. This approach may be performed by using action objects. "Action objects" are objects that have data including name (the name of the object) and script (the program that the user types or enters) and a method called trigger that executes the program in the code. A "script" is a small piece of dynamic code that can be attached to a system of larger piece of code, such as an application. Action objects may be used as target objects using the process depicted in FIG. 1. Using this model scripts can be attached to source objects in the visual builder such as push buttons or menu items such that activating the source object triggers execution of the script.

Many times, the user may enter code that is to be used repetitively. Also, action objects may be attached to events in parts of an application that are difficult or time consuming to reach. Therefore, it would be advantageous to have a method and system to efficiently and easily test an action object.

SUMMARY OF THE INVENTION

It is one object of the present invention to provide an improved data processing system.

It is another object of the present invention to provide an improved method and system for programming in a graphic user interface.

It is yet another object of the present invention to provide a method and system for testing a script in a graphic user interface.

The present invention provides a method and system for testing a script or section of code within program using a graphic user interface. The data processing system also includes an object oriented system having a first and second object within it. A script or a section of code is associated with the first object, wherein the script or section of code is associated as a method within the first object. A second object is displayed within the graphic user interface, wherein the second object may be selected by a user. Selection of the second object within the graphic user interface by a user results in a message being sent to the first object triggering execution of the script or section of code. Such a system provides an efficient method and apparatus for testing a script or section of code.

In accordance with a preferred embodiment of the present invention, the first action is an action object that includes a script or section of code that is associated with it as a method. The method is contained within a slot in the action. The second object is a "trigger" object. The trigger object may take the form of various graphical objects, such as a push button.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 2:
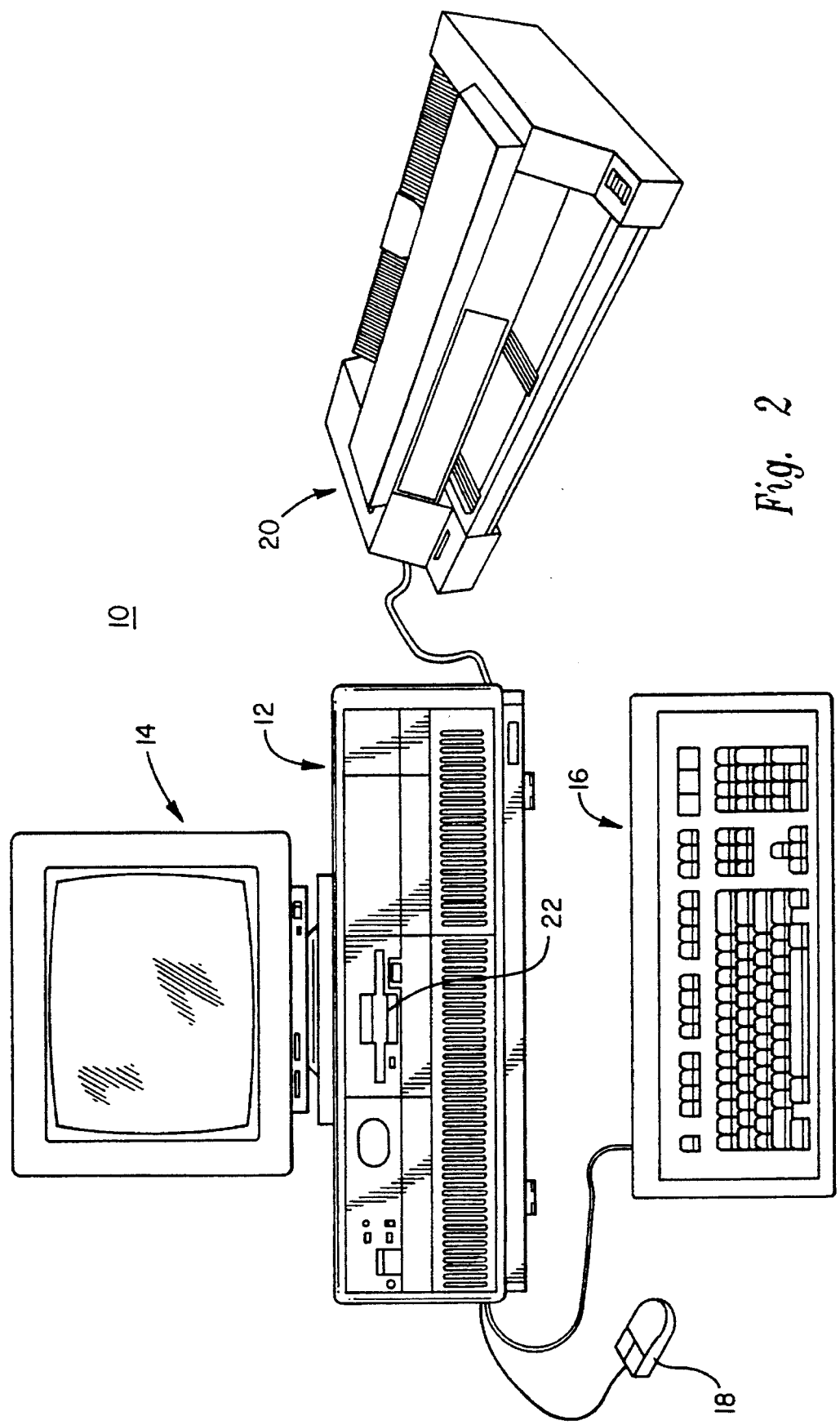
FIG. 2 depicts a data processing system in the form of a personal computer in which the present invention can be employed is depicted.

Referring now to the figures, and in particular to FIG. 2, a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as floppy diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a RQM on a motherboard or planar, includes diagnostic routines which are contained in a power on self test section referred to as POST.

Figure 3:
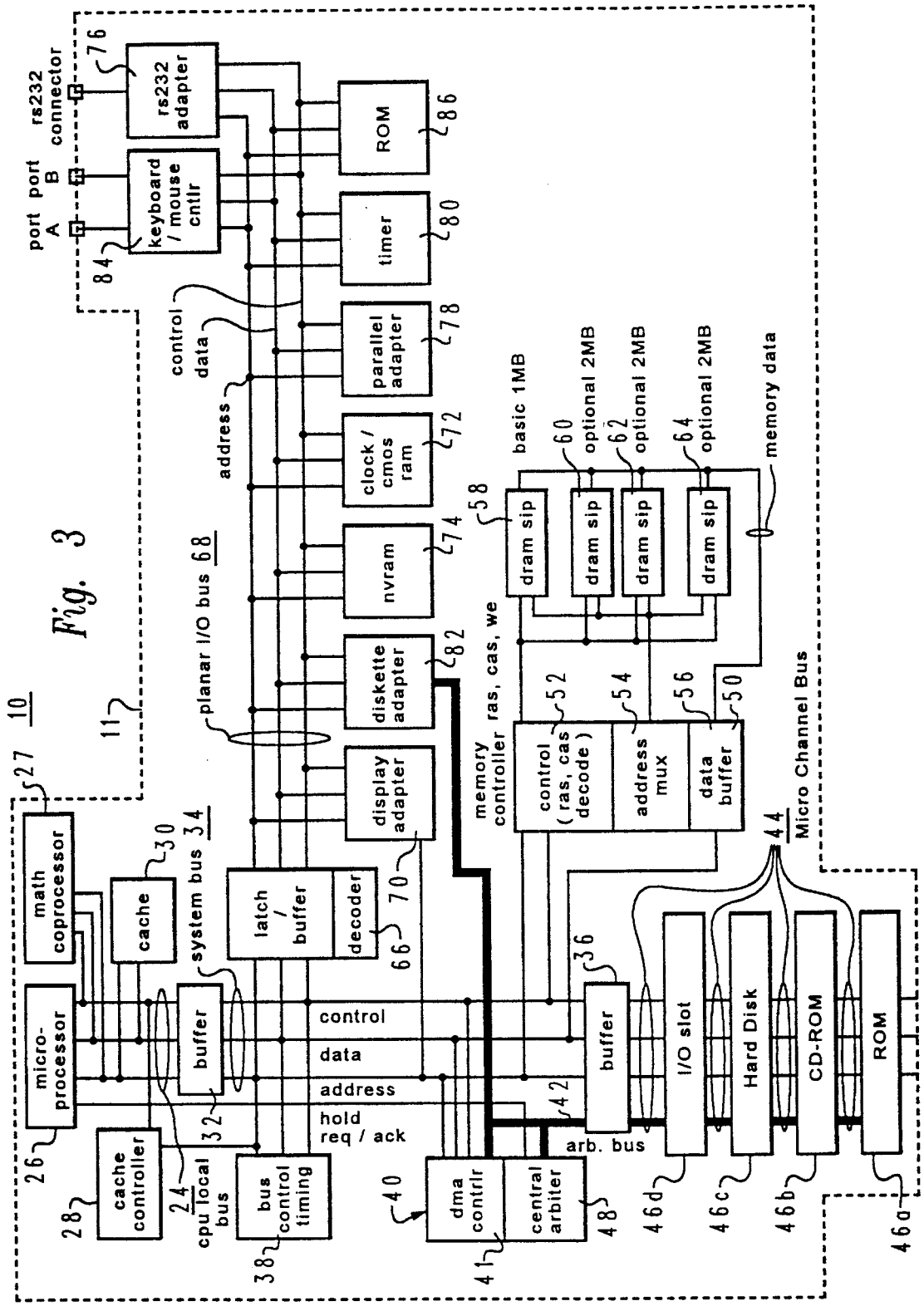
FIG. 3 is block diagram of a personal computer system illustrating the various components of personal computer system in accordance with the present invention.

Prior to relating the above structure to the present invention, a summary of the operation in general of personal computer system 10 may merit review. Referring to FIG. 3, there is shown a block diagram of personal computer system 10 illustrating the various components of personal computer system 10 in accordance with the present invention. FIG. 3 further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Pentium microprocessor, which is sold by Intel Corporation. "Pentium" is a trademark of Intel Corporation.

While the present invention is described hereinafter with particular reference to the system block diagram of FIG. 3, it is to be understood at the outset of the description which follows, it is contemplated that the apparatus and methods in accordance with the present invention may be used with other hardware configurations of the planar board. For example, the system processor could be an Intel 80286, 80386, or 80486 microprocessor. These particular microprocessors can operate in a real addressing mode or a protected addressing mode. Each mode provides an addressing scheme for accessing different areas of the microprocessor's memory.

Returning now to FIG. 3, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and an optional feature bus such as the Micro Channel bus 44. "Micro Channel" is a registered trademark of International Business Machines Corporation. Connected to bus 44 are a plurality of I/O slots 46a–46d for receiving Micro Channel adapter cards which may be further connected to an I/O device or memory. In the depicted example, I/O slot 46a has a hard disk drive connected to it; I/O slot 46b has a CD-ROM drive connected to it; and I/O slot 46c has a ROM on an adapter card connected to it. Other devices, such as a modem may be connected to an I/O slot. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexer 54, and a data buffer 56. Memory control unit 50 is further connected to a random access memory as represented by RAM module 58. Memory controller 52 includes the logic for mapping addresses to and from CPU 26 to particular areas of RAM 58. While the personal computer system 10 is shown with a basic 1 megabyte RAM module, it is understood that additional memory can be interconnected as represented in FIG. 3 by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

Figure 4:
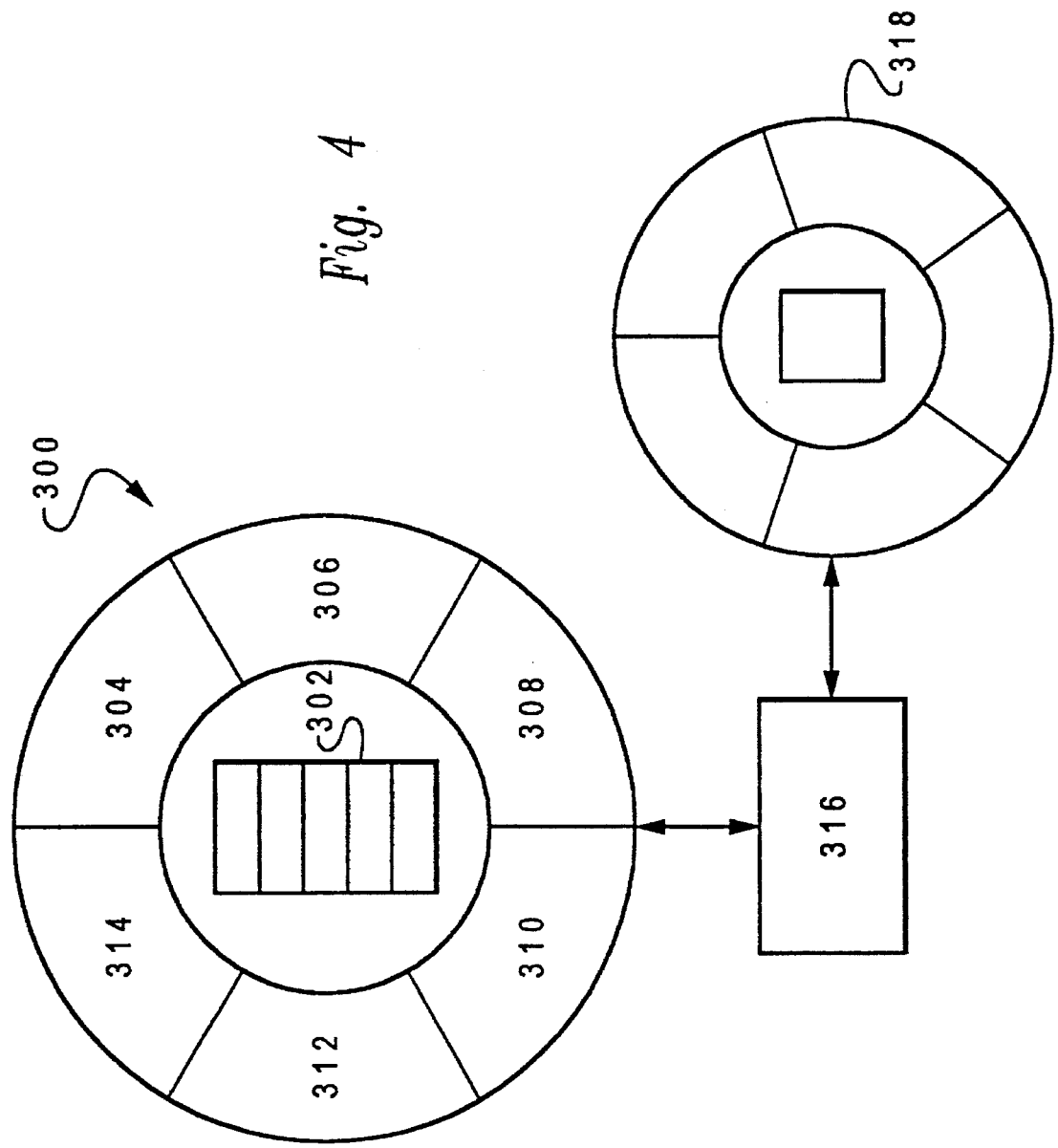
FIG. 4 is a diagram of objects in an object oriented system in accordance with a preferred embodiment of the present invention.

With reference to FIG. 4, a diagram of objects in an object oriented system is depicted in accordance with a preferred embodiment of the present invention. An object encapsulates data and the methods needed to operate on that data. Objects can be represented by a "doughnut diagram" such as shown in FIG. 3. Object data is shown in the center 302 surrounded by the applicable methods 304 to 314. Data 302 may be modified only by the methods of that object. Methods 304–314 are invoked by receiving messages from other objects. A typical object oriented system will have a message router 320 that routes messages between objects. Thus, object 330 causes Method C 308 to be invoked by sending a message 332 to message router 320 that in turn sends message 322 to Method C 308 of object 300.

Object frameworks are constructed to provide a set of objects for application and system developers to use to construct a delivered system. The IBM System Object Model (SOM) framework, for example, provides a language independent set of objects for use in systems development.

Objects are grouped into classes of related objects. The class description contains information relevant to all objects in a class, including a description of instance variables maintained by each of the objects and the available object methods. An object instance is created (or "instantiated") based on that information and has the properties defined in the object class. For example, the object class DOG can include the instance variables "dog_type" and "dog_name" and a "bark" method implementing the response to a bark message. An instance of dog, e.g. ROVER, will maintain the type and name instance variables for itself and will respond to the bark message.

Abstract classes are used to describe the interfaces and methods expected to be used by a class without providing detail on the implementation of those methods. Abstract classes are useful in frameworks where the implementation details are to be left to the implementor. Concrete classes are created as subclasses of abstract classes and implement those classes.

Figure 5:
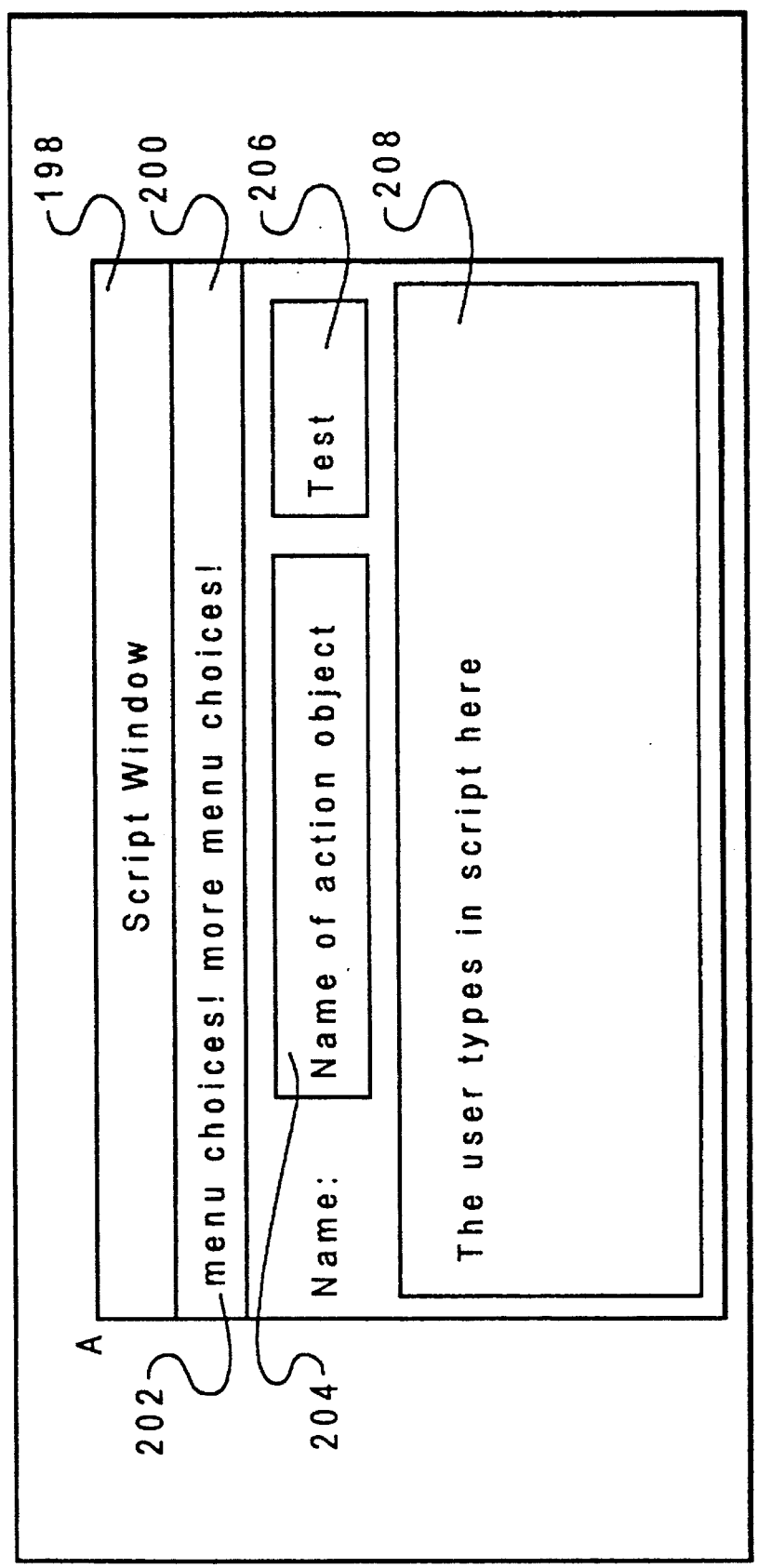
FIG. 5 a more detailed diagram of a script window is depicted in accordance with a preferred embodiment of the present invention.

Most visual programming systems include a window in which a user can type scripts. With reference to FIG. 5, a more detailed diagram of a script window is depicted in accordance with a preferred embodiment of the present invention. Windows for typing scripts, such as window 198, are typically called script editors. Window 198 includes menu choices 200 and 202. In addition, the name of the action object is displayed in field 204 in association with button 206, which is labeled test. A script is typed by a user within field 208 of window 198. Within an object oriented system, a debugger typically requires an object and some method on the object for a debugging session. To debug an object a debug mode is set to "true" and the method on the object is executed. Button 206 is a test button within window 198 that tests the script when it is selected by a user using pointer 7.

Within existing visual programming systems, a builder object exists representing the entire visual programming system. A method on the builder object called set Debug-Mode exists that executes code run within the debugger in response to the method being called. Typically debuggers are included in most object oriented visual programming systems.

Code can be executed with or without the debugger being active. In the depicted example, set deBugMode makes the debugger active for testing code. DigiTalk Parts is a visual programming system that is object oriented and includes a debugger. As mentioned before objects have methods and data and generate events. Whenever the event of a source object occurs, each method in its event list is executed. A test object is created for use in debugging code entered by a user.

Typically, visual programming systems that are object oriented support collections. Collections are objects that hold other objects. A "set" collection holds objects in no particular order. Sets include methods to add and remove objects in no particular order from the set. A "list" collections holds objects in a specific order. Lists have add and remove methods. When an add is called, a user specifies an index where the object is to be added. A "dictionary" holds the objects an associates a key with each object.

Figure 6:
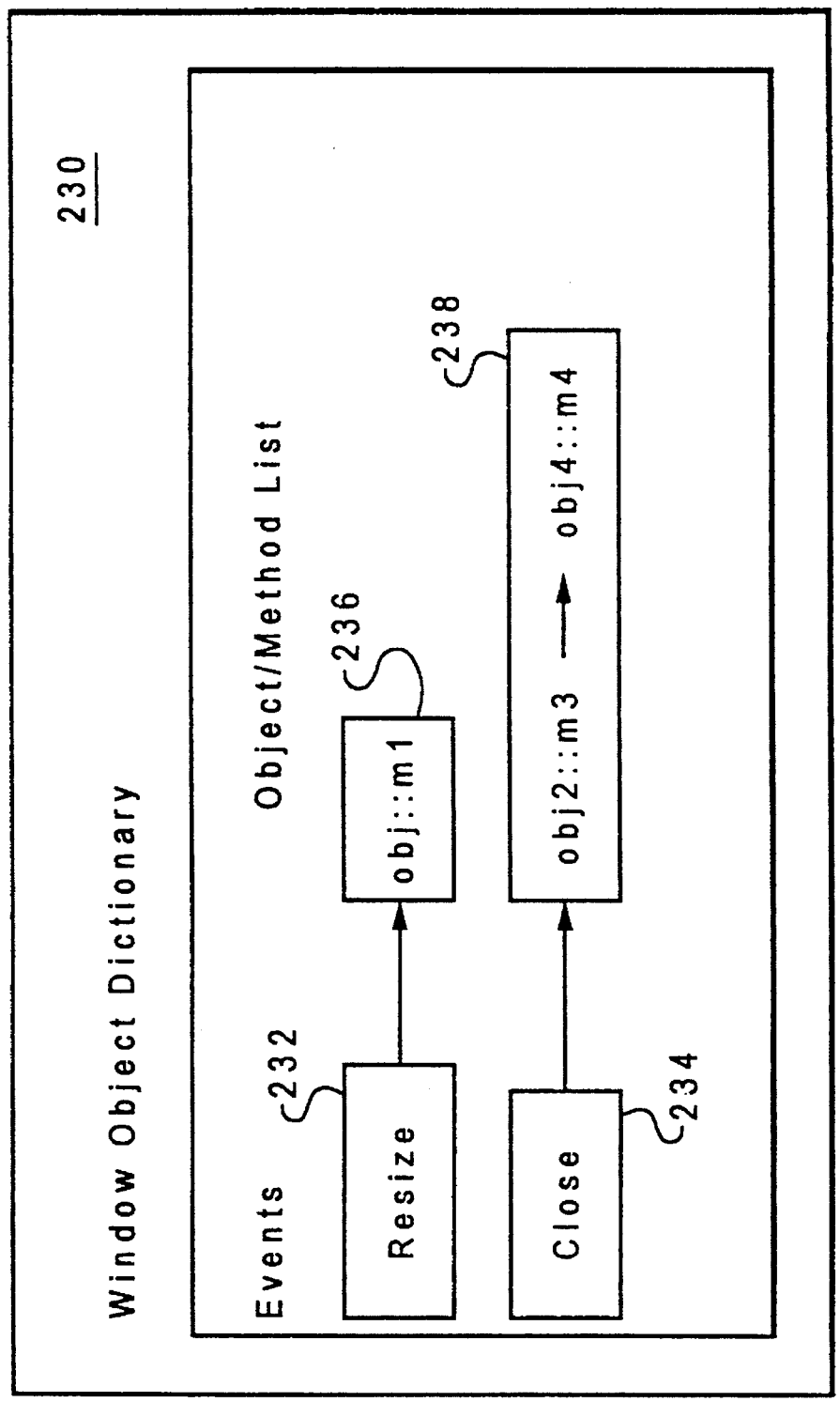
FIG. 6 is a diagram of a data structure representing a collection object is depicted in accordance with a preferred embodiment of the present invention.

Referring to FIG. 6, a diagram of a data structure representing a collection object is depicted in accordance with a preferred embodiment of the present invention. Window 230 includes two types of collections, dictionaries and lists. Each visual object includes a dictionary with each entry in the dictionary having a key event and a list of action objects. With reference again to FIG. 6, window 230 supports two events: Resize 232 and Close 234. Resize 232 includes an associated list 236 that has one entry: method m1 on obj. Close 234 is an event having an associated list 238 including two entries: methods m3 and m4 on objects obj2 and obj4 respectively. Window 230 may be employed to associate a new action object with an event list in accordance with a preferred embodiment of the present invention. An "action object" is an object with a single method called a trigger method in the depicted example and instance data which consists of a script (a small program in the depicted example). Execution of the trigger method executes the script in the instance data.

Figure 7:
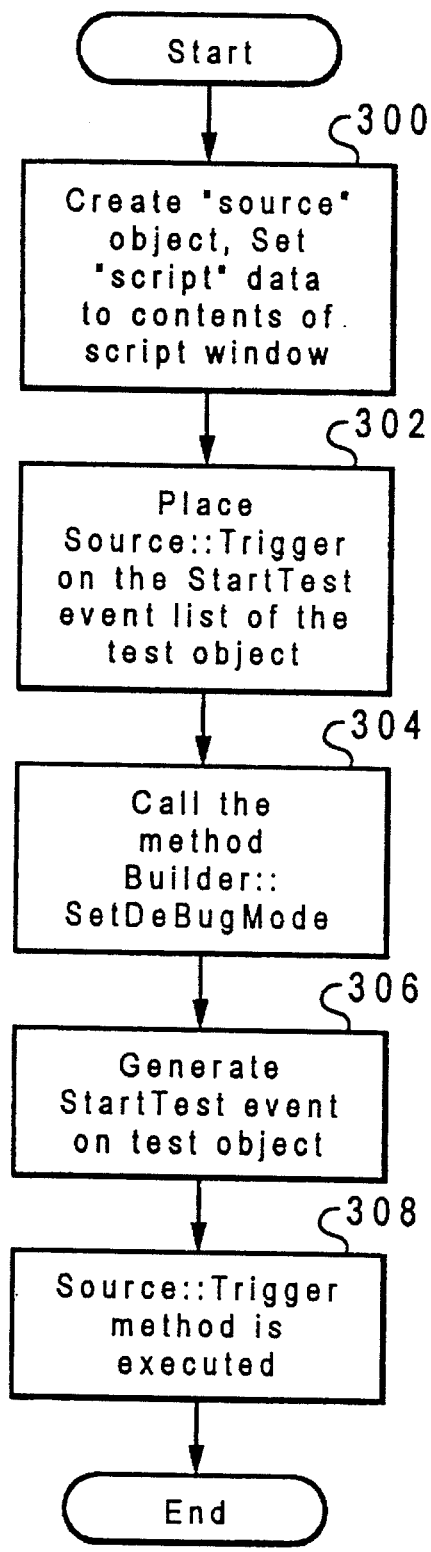
FIG. 7 flowchart of a process testing a script entered into a script editor in accordance with a preferred embodiment of the present invention.

Referring next to FIG. 7, a flowchart of a process for testing code entered into a script editor is depicted in accordance with a preferred embodiment of the present invention. The process begins by creating an action object also called the source (step 300). The script data is set to the script that the user has typed into the script window in creating the source. Thereafter, the trigger method for the source is placed within the StartTest list for the test object (step 302).

The process then calls the method Builder:: SetDebugMode (step 304). Calling this method results in using the debugger when any code is executed. The process then generates a StartTest event on the test object (step 306). PM from International Business Machines and Windows from Microsoft Corporation are examples of GUI systems that employ events. Some events are physical events that can be generated by the user. For example a resize event is one generated by a user. The system also may generate events, i.e., a stack overflow event. Furthermore, some events may be logical events that are defined by users of the GUI. In the depicted example, the visual programming system is the user of the GUI and the StartTest event is a logical event. As a result, the source:: trigger method is executed (step 308).

Figure 8:
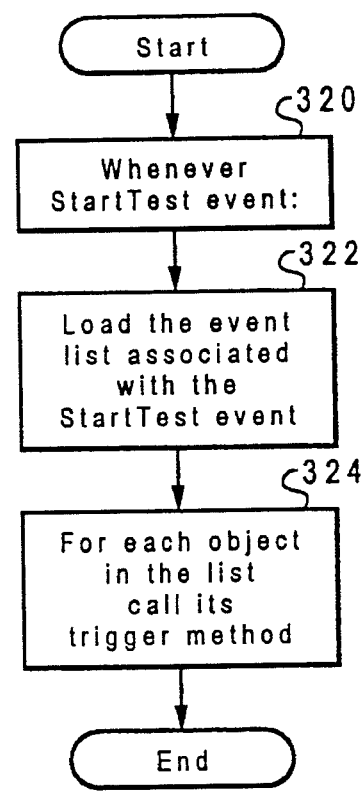
FIG. 8 is a flowchart of a process for processing a StartTest event is depicted in accordance with a preferred embodiment of the present invention.

With reference now to FIG. 8, a flowchart of a process for processing a StartTest event is depicted in accordance with a preferred embodiment of the present invention. The process begins by detecting a StartTest event (step 320). Thereafter, the event list associated with the StartTest event is loaded (step 322). For each object in the list, the trigger method is called (step 324) with the process terminating thereafter.

Figure 9:
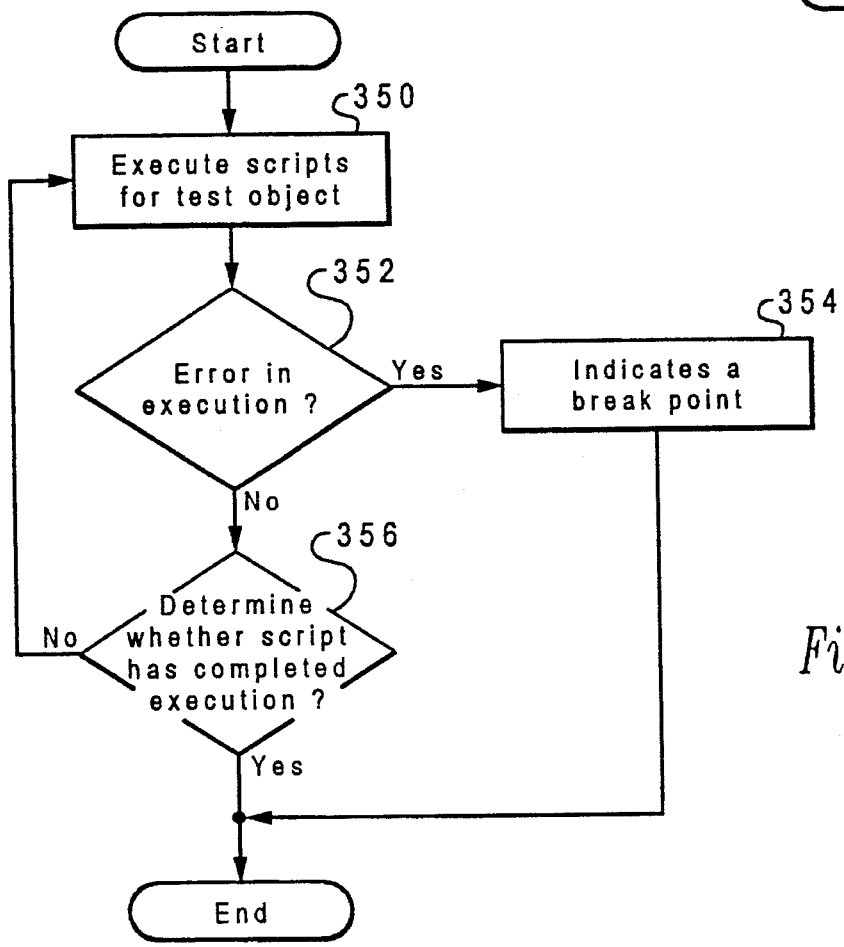
FIG. 9 is a flowchart of a process for testing a script is depicted in accordance with a preferred embodiment of the present invention.

With reference now to FIG. 9, a flowchart of a process for testing a script is depicted in accordance with a preferred embodiment of the present invention. The process begins by executing the script for a test object (step 350). The process determines whether an error in execution has occurred, resulting in a break point (step 352). If a break point has occurred, the process indicates that a break point has been reached (step 354) such an indication may occur in the form of a visual or audible prompt to a user or may occur in the form of storing an indication of the break point in a file. The process terminates thereafter.

With reference again to step 352 if a breakpoint does not occur, the process determines whether the script has completed execution (step 356). If the script has not completed execution, the process then returns to step 350, otherwise, the process terminates.

Figure 1:
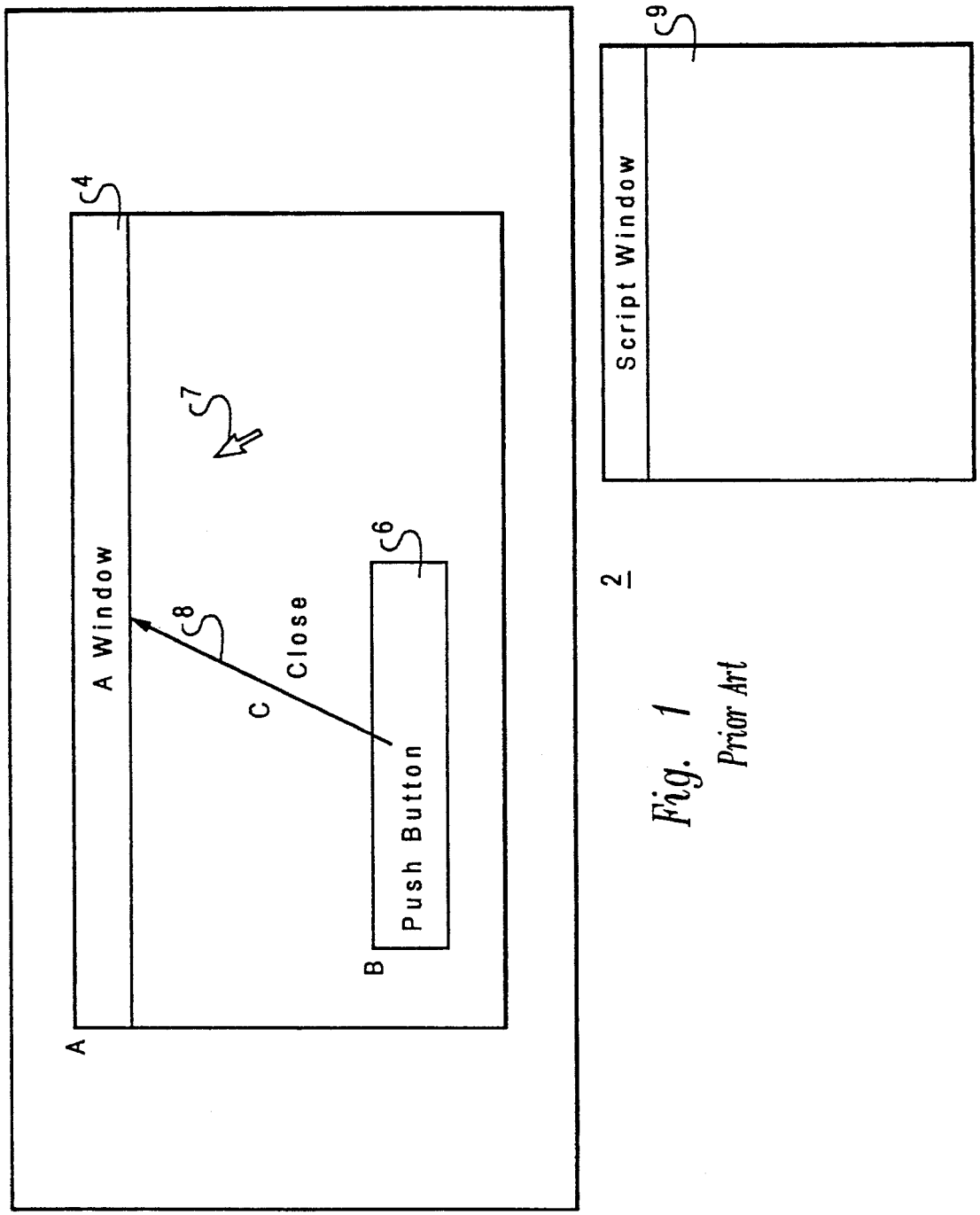
FIG. 1 depicts a window in which visual programming may be performed.

The processes depicted and described in FIGS. 5–9 may be implemented by those of ordinary skill in the art within the data processing system depicted in FIGS. 1 and 2. The processes of the present invention also may be implemented in a program storage device that is readable by a data processing system, wherein the program storage device encodes data processing system executable instructions coding for the processes of the present invention. The program storage device may take various forms including, for example, but not limited to a hard disk drive, a floppy disk, an optical disk, a RAM, a ROM, and an EPROM, which are known to those skilled in the art. The processes stored on a program storage device are dormant until activated by using the program storage device with the data processing system. For example, a hard drive containing data processing system executable instructions for the present invention may be connected to a data processing system; a floppy disk containing data processing system executable instructions for the present invention may be inserted into a floppy disk drive in the data processing system; or a ROM containing data processing system executable instructions for the present invention may be connected to the data processing system via a card or adapter connected to an I/O slot.

While the invention has been particularly shown and described with reference to a preferred embodiment, it will be understood by those skilled in the art that various changes in form and detail may be made therein without departing from the spirit and scope of the invention.

What is claimed is:

1. A method for providing a testing facility in a program development tool within a data processing system, said method comprising:

associating a dictionary object with each static object constructed by a user within said program development tool for a program being developed, wherein said dictionary object includes an event list and a method list;

adding a method entry to said method list within said dictionary object in response to each action object constructed by a user within said program development tool for said program being developed; and in response to an association of a static object with an action object utilizing an event key selected by a user within said program development tool, associating an event key in said event list which corresponds to said selected event key with a method entry in said method list which corresponds to said action object, such that the effect of said action object on said static object can be tested via a triggering of said action object by a user within said program development tool independent of the status of all other static objects within said program being developed.

2. The method for providing a testing facility in a program development tool within a data processing system according to claim 1, wherein said step of adding a method entry to said method list within said dictionary object in response to each action object constructed by a user further includes the step of adding a method entry to said method list within said dictionary object in response to each action object constructed by a user in a script form.

3. The method for providing a testing facility in a program development tool within a data processing system according to claim 1, wherein said step of testing via a triggering of said action object further comprises the step of testing until a break point is reached.

4. A data processing system having a testing facility in a program development tool for program development, said data processing system comprising:

means for associating a dictionary object with each static object constructed by a user within said, program development tool for a program being developed, wherein said dictionary object includes an event list and a method list;

means for adding a method entry to said method list within said dictionary object in response to each action object constructed by a user within said program development tool for a program being developed; and in response to an association of a static object with an action object utilizing an event key selected by a user within said program development tool, means for associating an event key in said event list which corresponds to said selected event key with a method entry in said method list which corresponds to said action object, such that the effect of said action object on said static object can be tested via a triggering of said action object by a user within said program development tool independent of the status of all other static objects within said program being developed.

5. The data processing system having a testing facility in a program development tool for program development according to claim 4, wherein said action object is in script form.

6. The data processing system having a testing facility in a program development tool for program development according to claim 4, wherein said event list comprises a plurality of event keys.

7. A program development tool within a data processing system, wherein said program development tool includes a testing facility, said program development tool comprising:

means for associating a dictionary object with each static object constructed by a user within said program development tool for a program being developed, wherein said dictionary object includes an event list and a method list;

means for adding a method entry to said method list within said dictionary object in response to each action object constructed by a user within said program development tool for a program being developed; and in response to an association of a static object with an action object utilizing an event key selected by a user within said program development tool, means for associating an event key in said event list which corresponds to said selected event key with a method entry in said method list which corresponds to said action object, such that the effect of said action object on said static object can be tested via a triggering of said action object by a user within said program development tool independent of the status of all other static objects within said program being developed.

8. The program development tool within a data processing system according to claim 7, wherein said action object is in script form.

9. The program development tool within a data processing system according to claim 7, wherein said event list comprises a plurality of event keys.

10. A computer program product residing on a computer usable medium for providing a testing facility within a data processing system said computer product comprising:

program code means for associating a dictionary object with each static object constructed by a user within said computer program for a program being developed, wherein said dictionary object includes an event list and a method list;

program code means for adding a method entry to said method list within said dictionary object in response to each action object constructed by a user within said computer program product for a program being developed; and in response to an association of a static object with an action object utilizing an event key selected by a user within said computer program product, means for associating an event key in said event list which corresponds to said selected event key with a method entry in said method list which corresponds to said action object, such that the effect of said action object on said static object can be tested via a triggering of said action object by a user within said program development tool independent of the status of all other static objects within said program being developed.

11. The computer program product residing on a computer usable medium for providing a testing facility within a data processing system according to claim 10, wherein said action object is in script form.

12. The computer program product residing on a computer usable medium for providing a testing facility within a data processing system according to claim 10, wherein said event list comprises a plurality of event keys.

* * * * *

UNITED STATES PATENT AND TRADEMARK OFFICE
CERTIFICATE OF CORRECTION

PATENT NO. : 5,590,330
DATED : December 31, 1996
INVENTOR(S) : Coskun et al.

It is certified that error appears in the above-indentified patent and that said Letters Patent is hereby corrected as shown below:

Column 4, line 41: change "RQM" to --ROM--

Signed and Sealed this

Twenty-fifth Day of November, 1997

Attest:

BRUCE LEHMAN

*Attesting Officer*      *Commissioner of Patents and Trademarks*